(12) United States Patent
Duggan (10) Patent No.: US 12,215,734 B2
(45) Date of Patent: Feb. 4, 2025

(54) STRUT AND CLIP ASSEMBLY FOR STIFFENING A HANGER ROD

(71) Applicant: ERICO International Corporation, Solon, OH (US)

(72) Inventor: Daniel C. Duggan, Chesterfield, MO (US)

(73) Assignee: ERICO International Corporation, Solon, OH (US)

( * ) Notice: Subject to any disclaimer, the term of this patent is extended or adjusted under 35 U.S.C. 154(b) by 15 days.

(21) Appl. No.: 18/310,499

(22) Filed: May 1, 2023

(65) Prior Publication Data

US 2023/0265873 A1 Aug. 24, 2023

Related U.S. Application Data (60) Continuation of application No. 17/532,326, filed on Nov. 22, 2021, now Pat. No. 11,639,732, which is a continuation of application No. 16/877,191, filed on May 18, 2020, now Pat. No. 11,181,136, which is a continuation of application No. 16/057,562, filed on Aug. 7, 2018, now Pat. No. 10,662,990, which is a continuation of application No. 15/246,321, filed on Aug. 24, 2016, now Pat. No. 10,087,967, which is a
(Continued)

(51) Int. Cl.
| | |
|---|---|
| *A47G 29/02* | (2006.01) |
| *F16B 2/14* | (2006.01) |
| *F16B 2/18* | (2006.01) |
| *F16B 7/04* | (2006.01) |
| *F16L 3/00* | (2006.01) |
| *F16L 3/24* | (2006.01) |
| *F16L 3/11* | (2006.01) |

(52) U.S. Cl.
CPC .............. *F16B 7/0413* (2013.01); *F16B 2/14* (2013.01); *F16B 2/185* (2013.01); *F16L 3/00* (2013.01); *F16L 3/2431* (2019.08); *F16L 3/11* (2013.01); *F16L 3/24* (2013.01)

(58) Field of Classification Search
CPC .......... F16B 7/0413; F16B 2/14; F16B 2/185; F16L 3/00; F16L 3/2431; F16L 3/11; F16L 3/24
See application file for complete search history.

(56) References Cited

U.S. PATENT DOCUMENTS

| | | | |
|---|---|---|---|
| 1,380,518 A | 6/1921 | Bellig | |
| 2,643,428 A | 6/1953 | Jenne | |

(Continued)

FOREIGN PATENT DOCUMENTS

| | | |
|---|---|---|
| DE | 20320763 U1 | 5/2005 |
| EP | 0891726 A2 | 1/1999 |

OTHER PUBLICATIONS

Inventor J.N. Landry, Line Holder, U.S. Pat. No. 9,123,87, issued Feb. 16, 1909, 2 pages.

*Primary Examiner* — Amy J. Sterling
(74) *Attorney, Agent, or Firm* — Quarles & Brady LLP (57) ABSTRACT

A hanger-rod clip can be configured for use with a strut that at least partially surrounds a hanger rod to provide stiffness to the hanger rod. The hanger-rod clip can include a handle portion and a rod-clamping portion. The rod-clamping portion can be configured to urge the hanger rod into engagement with an internal surface of the strut as the handle portion is moved towards the strut.

11 Claims, 10 Drawing Sheets

Related U.S. Application Data division of application No. 14/919,567, filed on Oct. 21, 2015, now Pat. No. 9,441,656.

(60) Provisional application No. 62/066,964, filed on Oct. 22, 2014.

(56) References Cited

U.S. PATENT DOCUMENTS

| | | | |
|---|---|---|---|
| 2,676,680 A | 4/1954 | Kindorf |
| 2,901,798 A | 9/1959 | Jenne |
| 3,035,624 A | 5/1962 | Jaworski |
| 3,049,326 A | 8/1962 | Otterson |
| 3,238,585 A | 3/1966 | Froyd |
| 3,593,384 A | 7/1971 | Huggins |
| 3,842,561 A | 10/1974 | Wong |
| 3,930,288 A | 1/1976 | Black et al. |
| 4,040,589 A | 8/1977 | Mclay |
| 4,630,982 A | 12/1986 | Fenner |
| 4,676,470 A | 6/1987 | Okura |
| 4,926,607 A | 5/1990 | Platt et al. |
| 5,022,614 A | 6/1991 | Finderer |
| 5,224,246 A | 7/1993 | Royball |
| 5,412,843 A | 5/1995 | Krongauz et al. |
| 5,560,664 A | 10/1996 | Lotze et al. |
| 5,819,374 A | 10/1998 | Chiles et al. |
| 6,026,545 A | 2/2000 | Duggan |
| 6,202,962 B1 | 3/2001 | Snyder |
| 6,290,426 B1 | 9/2001 | VanGijsel et al. |
| 6,350,089 B1 | 2/2002 | Tekavec |
| 6,386,488 B1 | 5/2002 | Menachem |
| 6,415,560 B1 | 7/2002 | Rinderer |
| 6,454,232 B1 | 9/2002 | Roth |
| 6,631,601 B1 | 10/2003 | Roth |
| 6,783,104 B1 | 8/2004 | Roth |
| 6,837,009 B1 | 1/2005 | Roth |
| 6,848,873 B1 | 2/2005 | Husk |
| 6,971,623 B2 | 12/2005 | Allmon et al. |
| 6,991,198 B1 | 1/2006 | Roth |
| 7,044,426 B1 | 5/2006 | Allmon et al. |
| 7,086,633 B2 | 8/2006 | Welch et al. |
| 7,162,837 B1 | 1/2007 | Roth |
| 7,188,809 B1 | 3/2007 | Roth |
| 7,207,527 B2 | 4/2007 | Opperthauser |
| 7,258,519 B2 | 8/2007 | Shimizu |
| 7,341,232 B2 | 3/2008 | Masas |
| 7,384,018 B2 | 6/2008 | Moretto |
| 7,540,454 B2 | 6/2009 | Gauger |
| 7,559,512 B2 | 7/2009 | Digirolamo et al. |
| 7,654,043 B2 | 2/2010 | Heath |
| 7,661,915 B2 | 2/2010 | Whipple |
| 7,819,364 B2 | 10/2010 | Duggan |
| 7,984,534 B2 | 7/2011 | Duggan |
| 8,372,915 B2 | 2/2013 | Ohama et al. |
| 9,441,656 B2 | 9/2016 | Duggan |
| 10,087,967 B2 | 10/2018 | Duggan |
| 10,302,249 B1 * | 5/2019 | Kelly .................... B25H 1/04 |
| 10,662,990 B2 | 5/2020 | Duggan |
| 2004/0155160 A1 | 8/2004 | Welch et al. |
| 2005/0230582 A1 | 10/2005 | Birli et al. |
| 2006/0024127 A1 | 2/2006 | Heath |
| 2006/0180715 A1 | 8/2006 | Duggan |
| 2008/0156945 A1 | 7/2008 | Duggan |
| 2012/0160983 A1 | 6/2012 | Gousseinov et al. |
| 2012/0198664 A1 | 8/2012 | Kolasa |
| 2015/0316085 A1 | 11/2015 | Zhang et al. |
| 2017/0254681 A1 * | 9/2017 | Ellison .................... G01D 11/30 |
| 2022/0341451 A1 * | 10/2022 | Wang .................... F16B 2/04 |

* cited by examiner

STRUT AND CLIP ASSEMBLY FOR STIFFENING A HANGER ROD

CROSS-REFERENCE TO RELATED APPLICATIONS

This application is a continuation of U.S. patent application Ser. No. 17/532,326 titled "Strut and Clip Assembly for Stiffening a Hanger Rod" and filed on Nov. 22, 2021, which is a continuation of U.S. patent application Ser. No. 16/877,191 titled "Strut and Clip Assembly for Stiffening a Hanger Rod" and filed on May 18, 2020, which is a continuation of U.S. patent application Ser. No. 16/057,562 titled "Strut and Clip Assembly for Stiffening a Hanger Rod" and filed on Aug. 7, 2018, which is a continuation of U.S. patent application Ser. No. 15/246,321 titled "Strut and Clip Assembly For Stiffening a Hanger Rod" and filed on Aug. 24, 2016, which is a division of U.S. patent application Ser. No. 14/919,567 titled "Strut and Clip Assembly For Stiffening a Hanger Rod" and filed on Oct. 21, 2015, which claims priority to U.S. Provisional Patent Application No. 62/066,964 filed Oct. 22, 2014, each of which is incorporated herein by reference in its respective entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to hanger rods used in building construction. Specifically, it relates to an assembly that uses a manually actuated clip to stiffen a hanger rod.

BACKGROUND OF THE INVENTION

A hanger rod is part of a hanger assembly wherein one end of a threaded rod is vertically attached to the building structure, such as a concrete slab or a wood or steel beam. The other end has an attachment mechanism such as a yoke with a supporting structure, which is used to support building components (e.g., water pipes, HVAC ducts, cables, and electrical conduits) at a position relative to the concrete slab or beam. While hanger rods can be provided in any diameter, the typical size is either 3/8, 1/2, 5/8, 3/4, 7/8, 1 or 1 1/4 inches, depending on the structure that is to be supported. The lengths can be selected as needed for the particular construction project. Generally, a hanger rod is less than about 120 inches in length.

While these hanger rods are strong enough to support the various building components attached thereto, various assemblies and methods have been proposed to strengthen the hanger rod against deformation due to unusual stresses that may be experienced within the building, such as movement associated with an earthquake. Some devices make use of a stiffening member, such as a channel strut, angle iron, or pipe that is positioned substantially parallel to the hanger rod. One type of connection between the stiffening member and the hanger rod can be provided by welding the member to the rod, which is extremely time-consuming and not practical due to the expense involved. In another type of connection, the stiffening member and the hanger rod are connected in their parallel arrangement by a series of clamping devices by use of several manually driven fasteners, such as screws. Again, connection via fasteners can be a time-consuming process.

To keep installation costs down, there is a continuing need for stiffening assemblies for hanger rods that are simple to use, easy to make, and require minimal manual effort for installation. The present invention helps to satisfy this market need.

SUMMARY OF THE INVENTION

In one aspect, the present invention is a stiffening system for a hanger rod. The stiffening system includes a strut and a clip. The strut at least partially surrounds the hanger rod and extends along a length of the hanger rod. The strut includes an internal engagement surface adjacent to the hanger rod, and also a pivot region. The clip has a handle portion, a rod-clamping portion, and a fulcrum spaced away from the handle portion. The fulcrum pivotably engages the pivot region of the strut. The rod-clamping portion forces the hanger rod into tight engagement with the internal engagement surface of the strut in response to a pivoting movement about the fulcrum caused by the handle being actuated to an operational position.

In another aspect, the present invention is a clip for use with a strut that at least partially surrounds a hanger rod for the purpose of providing stiffness to the hanger rod. The clip includes a handle portion, a rod-clamping portion, and a fulcrum spaced away from the handle portion. The fulcrum is for pivotable engagement within the strut. The rod-clamping portion is for forcing the hanger rod into tight engagement with an engagement surface of the strut in response to the handle being actuated to an operational position.

In other aspect, the present invention is a clip for use with a strut that at least partially surrounds a hanger rod for providing stiffness to the hanger rod. The clip comprises a handle portion, a rod-clamping portion, and a fulcrum for being rotatably engaged within a pivot region of the strut. The rod-clamping portion forces the hanger rod into tight engagement with an engagement surface of the strut in response to the handle portion being moved to an operational position as the clip rotates around the fulcrum.

In other aspects, the present invention also involves methods for using a clip in conjunction with a strut that at least partially surrounds a hanger rod. Within the methods, a handle of the clip is actuatable by the user to wedge a rod-clamping portion of the clip between the hanger rod and the internal surface of the strut. Alternatively, the method may include actuating a handle of the clip by the user to sandwich the hanger rod between a rod-clamping portion of the clip and an internal rod-engaging surface of the strut.

The invention is also a method of stiffening a hanger rod, comprising (i) inserting the hanger rod into an elongated opening of a strut, (ii) inserting a rod-clamping portion of a clip into the elongated opening of the strut, (iii) moving a handle portion of the clip located external to the strut so as to engage a fulcrum of the clip against an internal surface of the strut, and (iv) rotating the handle portion of the clip toward the strut while the fulcrum is engaged against the internal surface of the strut to wedge the rod-clamping portion between the hanger rod and the internal surface of the strut.

In a further aspect, the invention is a method of stiffening a hanger rod, comprising, (i) inserting the hanger rod into an elongated opening of a strut, (ii) inserting a rod-clamping portion of a clip into the elongated opening of the strut, (iii) moving a handle portion of the clip located external to the strut so as to engage a fulcrum of the clip against an internal surface of the strut, (iv) rotating the handle portion of the clip toward the strut while the fulcrum is engaged against the internal surface of the strut to sandwich the hanger rod between the rod-clamping portion and an internal rod-engaging surface of the strut.

In yet another aspect, the present invention is a method of stiffening a hanger rod, comprising, (i) inserting the hanger rod into an elongated opening of a strut, (ii) inserting a rod-clamping portion of a clip into the elongated opening of the strut, and (iii) actuating a handle portion of the clip located external to the strut to sandwich the hanger rod between the rod-clamping portion and an internal rod-engaging surface of the strut.

Alternatively, the present invention is A method of stiffening a hanger rod, comprising, (i) inserting the hanger rod into an elongated opening of a strut, (ii) inserting a rod-clamping portion of a clip into the elongated opening of the strut, and (iii) actuating a handle portion of the clip located external to the strut to wedge the rod-clamping portion between the hanger rod and the internal surface of the strut.

In a further aspect, the invention is a method of stiffening a hanger rod, comprising, (i) inserting the hanger rod into an elongated opening of a strut, (ii) inserting a plurality of clips into the elongated opening of the strut, each of the plurality of clones being spaced away from each other, and (iii) actuating handle portions of each of the plurality of clips to clamp the hanger rod against an internal surface of the strut.

In some aspects, the invention is a hanger-rod clip for use with a strut that at least partially surrounds a hanger rod, to provide stiffness to the hanger rod, with the strut including first and second internal surfaces. The hanger-rod clip can include a handle portion and a rod-clamping portion. The rod-clamping portion can be rigidly connected to and extend away from the handle portion, and can be configured to urge the hanger rod into engagement with the first internal surface of the strut as the handle portion is pivoted towards the strut.

In other aspects, the invention is another hanger-rod clip for use with a strut that at least partially surrounds a hanger rod, to provide stiffness to the hanger rod, with the strut including first and second internal surfaces. The hanger-rod clip can include a handle portion, a rod-clamping portion that is rigidly connected to and extends away from the handle portion, and a first arm. The rod-clamping portion can be configured to urge the hanger rod into engagement with the first internal surface of the strut as the handle portion is pivoted towards the strut. The first arm can be configured to resiliently engage with the second internal surface of the strut, when the rod-clamping portion urges the hanger rod into engagement with the first internal surface of the strut, to secure the rod-clamping portion in engagement with the hanger rod.

In still other aspects, the invention is another hanger-rod clip for use with a strut that at least partially surrounds a hanger rod, to provide stiffness to the hanger rod, with the strut including a first internal corner and a first internal surface. The hanger-rod clip can include an L-shaped body that includes a handle portion and a rod-clamping portion, and a hooked finger that extends from the L-shaped body. The rod-clamping portion can be configured to urge the hanger rod into engagement with the first internal corner of the strut as the handle portion is pivoted towards the strut.

The hooked finger can be configured to resiliently engage with the first internal surface of the strut, when the rod-clamping portion urges the hanger rod into engagement with the first internal surface of the strut, to secure the rod-clamping portion in engagement with the hanger rod.

In other aspects, the invention can provide a hanger-rod clip for use with a strut that at least partially surrounds a hanger rod to provide stiffness to the hanger rod, the strut including first and second internal surfaces. The hanger-rod clip can include a handle portion, a rod-clamping portion integrally formed with the handle portion, and a fulcrum portion extending laterally from the rod-clamping portion. The rod-clamping portion can extend from and transversely relative to the handle portion. The rod-clamping portion can have a first rod-engagement surface configured to urge the hanger rod into engagement with the first internal surface of the strut and the fulcrum portion can be configured to engage the second internal surface, as the handle portion is pivoted towards the strut.

In still other aspects, the invention can provide a hanger-rod clip for use with a strut that at least partially surrounds a hanger rod to provide stiffness to the hanger rod, the strut including a first internal surface and a set of reentrant lips. The hanger-rod clip can include a handle portion, a rod-clamping portion extending transversely from the handle portion to form a L-shaped body, and a fulcrum portion extending laterally relative to the rod-clamping portion. The rod-clamping portion can be configured to urge the hanger rod into engagement with the first internal surface of the strut as the handle portion is pivoted towards the strut. The fulcrum portion can be configured to resiliently engage with the set of reentrant lips of the strut when the rod-clamping portion urges the hanger rod into engagement with the first internal surface of the strut, to secure the rod-clamping portion in engagement with the hanger rod.

In some aspects, the invention can provide a hanger-rod clip for use with a strut that at least partially surrounds a hanger rod to provide stiffness to the hanger rod, the strut including first and second internal corners. The hanger-rod clip can include an L-shaped body that includes a handle portion and a rod-clamping portion. The rod-clamping portion can have a first rod-engagement surface and a second rod-engagement surface at respective corners opposite the handle portion. The first and second rod-engaging surfaces can be configured to urge the hanger rod into engagement with the first and second internal corners, respectively, of the strut as the handle portion is pivoted towards the strut.

Additional aspects of the invention will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Figure 1A:
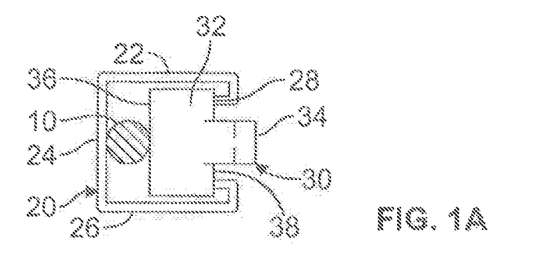
FIG. 1A is a top view of a clip and strut assembly for stiffening a hanger rod according to one embodiment of the present invention.
Figure 1B:
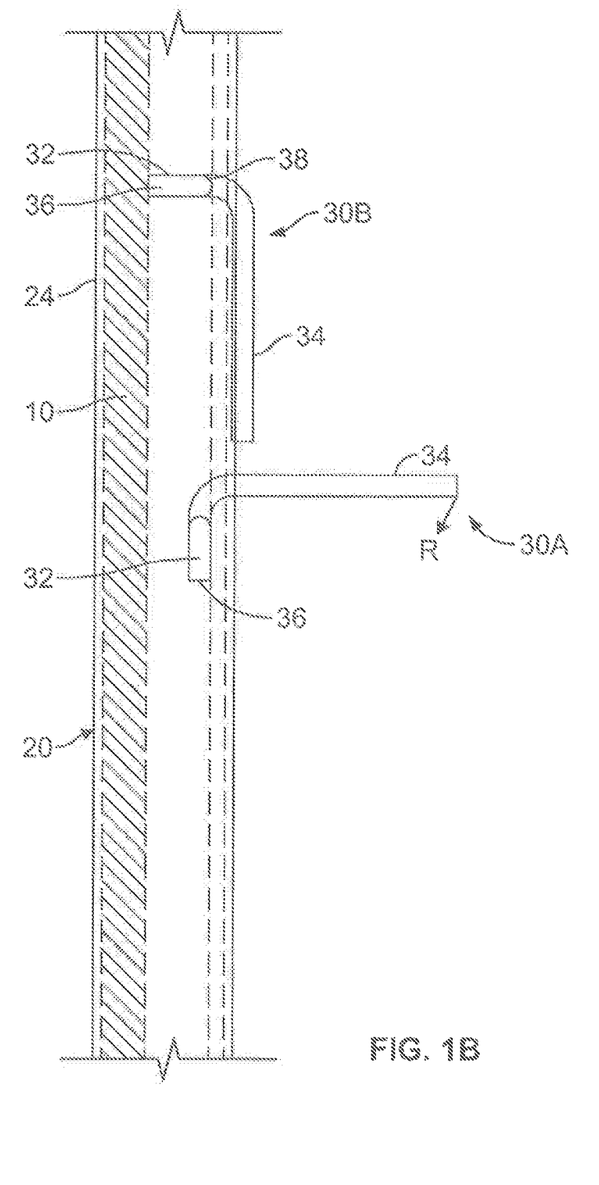
FIG. 1B is a side cross-sectional view of the clip and strut assembly of FIG. 1A.

Referring to FIGS. 1A and 1B, a hanger rod 10 is located within an elongated channel-type strut 20 that has an opening for receiving the hanger rod 10. The hanger rod 10 is typically part of a hanger assembly such that one end of the hanger rod 10 is vertically attached to a building structure (e.g., a concrete slab or a beam) and a connecting member is threadably coupled to the hanger rod 110 for supporting an additional building component, such as a water pipe. The strut 20 has a first wall 22, a second wall 24, and a third wall 26. The opening on the strut 20 that initially receives the hanger rod 10 is opposing the second wall 24. The second wall 24 includes an internal rod-engagement surface against which the hanger rod 10 is clamped by a clip 30. On either side of and adjacent to the opening in the strut 20, the strut 20 includes a pair of clip-engagement surfaces 28 that act as the strut's pivot region for a fulcrum portion of the clip 30, as described in more detail below. Accordingly, the hanger rod 10 is at least partially surrounded by the channel-type strut 20.

The clip 30 includes a rod-clamping portion 32 that is located within the strut 20 and a handle portion 34 that is located external to the strut 20. The rod-clamping portion 32 is in a transverse orientation (e.g., generally perpendicular in the illustrated embodiments) relative to the handle portion 34, such that the clip 30 has generally an L-shaped configuration. The rod-clamping portion 32 includes an engagement surface 36 that is moved into position against and engages the hanger rod 10. The clip 30 also includes a fulcrum portion 38 that engages the pair of clip-engaging surfaces 28 located on the strut 20. As shown in FIG. 1A, the fulcrum portion 38 is part of the surface on the rod-clamping portion 32 that opposes the rod-engagement surface 36. The fulcrum portion 38 can also be located at other regions of the clip 30 that are spaced away from the manually actuatable handle portion 34 and, thus, can be outside the rod-clamping portion 32.

FIG. 1B illustrates two clips 30a and 30b into different positions on the strut 20. In particular, the lower clip 30a is in the "open" position, where it has been initially inserted into the strut 20 by manual operation from the user. When the clip 30 is in the open position, the clip 30 is moveable within the strut 20 along a length of the hanger rod 10 so that its final location on the hanger rod 10 can be selected by the user. In the open position, the handle portion 34 of the lower clip 30a extends away from the strut 20 as the rod-clamping portion 32 is inserted into the opening of the strut 20. The engagement surface 36 is located away from the hanger rod 10 when the clip 30a is oriented in the open position. As shown by the arrow "R" in FIG. 1A, the lower clip 30a pivots around the fulcrum portion 38, which itself is engaged against the clip engaging surfaces 28 of the strut 20, as a manual force is placed on the handle portion 34. The rotational movement causes the engagement surface 36 to move towards the hanger rod 10.

The upper clip 30b is in the "closed" or operational position as its handle portion 34 has been fully rotated towards the strut 20. The rotational movement of the clip 30b causes the engagement surface 36 to be forced against the hanger rod 10, such that the hanger rod 10 is clamped (sandwiched) between the engagement surface 36 of the rod-clamping portion 32 and an internal surface on the second wall 24 of the strut 20. In other words, the rotational movement of the handle portion 34 of the clip 30b causes the rod-clamping portion 32 of the clip 30 to be wedged between the internal surface 28 of the strut 20 (which is engaging the fulcrum 38 of the clip) and the hanger rod 10. When in the closed position, the assembly of the strut 20 and the clip 30 functions to stiffen the hanger rod 10 and resist buckling under compression forces, which may result from building movements caused by vibrations or earthquakes.

The present invention contemplates placing multiple clips 30 along the length of a single hanger rod 10, such that the clips 30 are generally spaced apart by a distance that is calculated in accordance with accepted engineering practice to provide the required resistance to buckling of the hanger rod 10 under a calculated compression loading, such as that experienced in earthquakes, by bracing the hanger rod 10 with the clips 30. Generally, the accepted engineering practice is to use the American Institute of Steel Construction buckling formula, Kl/r, where K is a variable representing the buckled shape of the hanger rod 10, 1 is the maximum spacing between clips 30, and r is the least radius of gyration of the hanger rod 10.

The strut 20 is typically a standard, commonly used strut for building construction. For example, one common strut 20 has cross-sectional dimensions of 1⅝ inches by 1⅝ inches. Because of the desire to wedge the rod-clamping portion 32 of the clip 30 between the internal surface 28 of the strut 20 and the rod 10, the dimensions of the rod-clamping portion 32 of the clip 30 and the location of the fulcrum 38 are dependent on the strut 20 to which the clamp 30 is to be assembled.

Figure 2A:
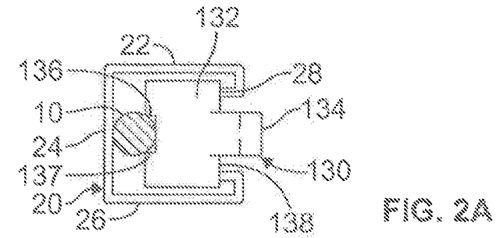
FIG. 2A is a top view of a clip and strut assembly for stiffening a hanger rod according to another embodiment of the present invention.
Figure 2B:
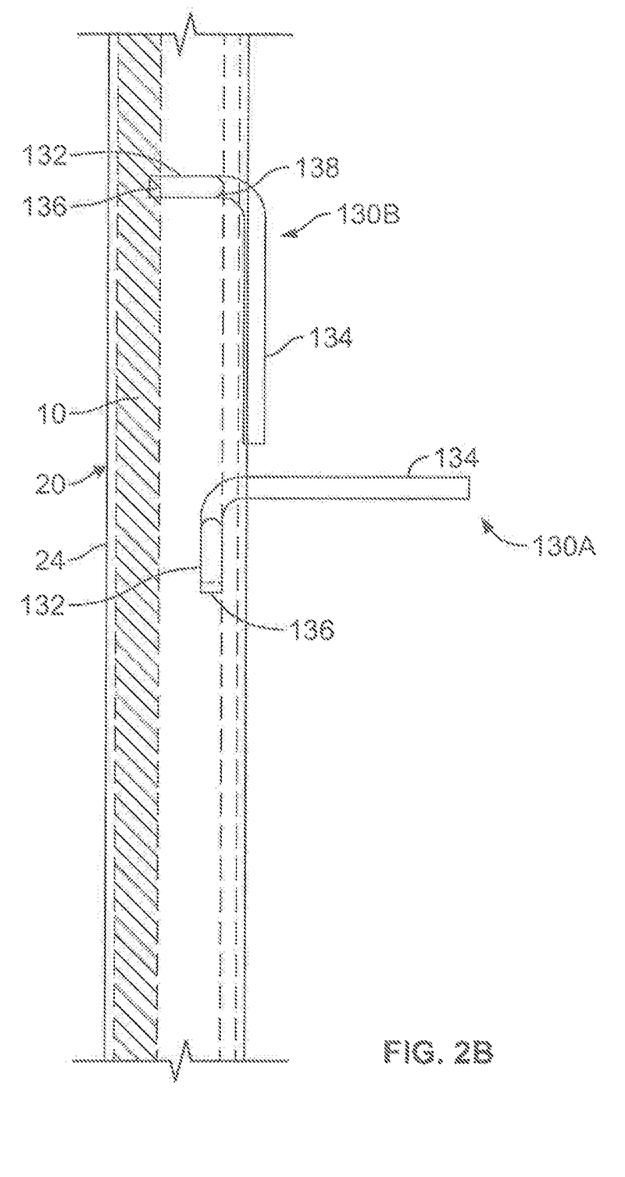
FIG. 2B is a side cross-sectional view of the clip and strut assembly of FIG. 2A.

Turning now to FIGS. 2A and 2B, the hanger rod 10 and the channel-type strut 20 are shown relative to a different embodiment of a clip 130. It should be noted that structures and function of the clip 130 are similar to the general structures and functions of the clip 30 in FIGS. 1A and 1B (except for the differences noted below), and that 100-series reference numerals have been used in FIGS. 2A and 2B to delineate those similar structures (e.g., the handle portion 134 in the clip 130 in FIGS. 2A-2B is similar to the handle portion 34 in the clip 30 in FIGS. 1A-1B, etc.). In this embodiment, the engagement surface 136 of the rod-clamping portion 132 is located within a groove 137. While the groove 137 can have various shapes, the groove 137 is sized to receive a certain size of hanger rod 10 to provide some lateral frictional resistance when the clip 130 is in the closed position. In other words, the groove 137 receives a portion of the hanger rod 10 such that there are regions of the rod-clamping portion 132 located on either side of the hanger rod 10. The present invention contemplates having different clips 130 with different sized grooves 137 that can receive different diameters of hanger rods 10. For example, one size groove 137 on a first clip 130 may be useful for a few different diameters of hanger rods 10. And a second size groove 137 on a second clip 130 may be useful for other diameters of hanger rods 10.

Figure 3A:
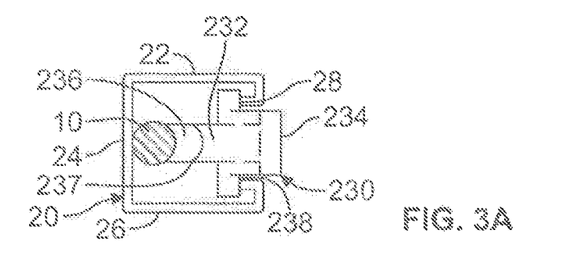
FIG. 3A is a top view of a clip and strut assembly for stiffening a hanger rod according to yet another embodiment of the present invention.
Figure 3B:
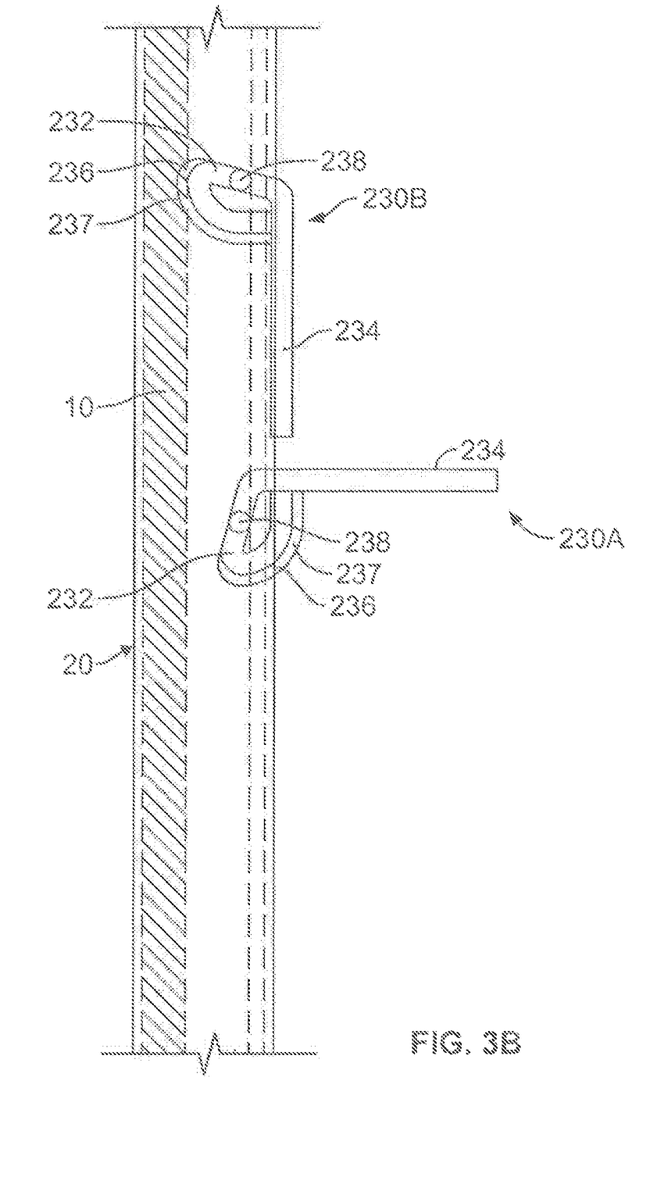
FIG. 3B is a side cross-sectional view of the clip and strut assembly of FIG. 3A.
Figure 4A:
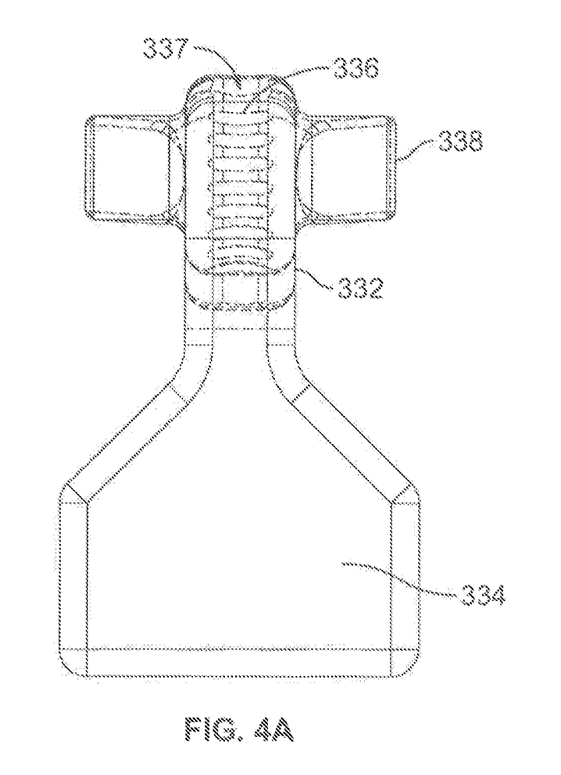
FIG. 4A is a front view of a clip for stiffening a hanger rod according to a further embodiment of the present invention.
Figure 4B:
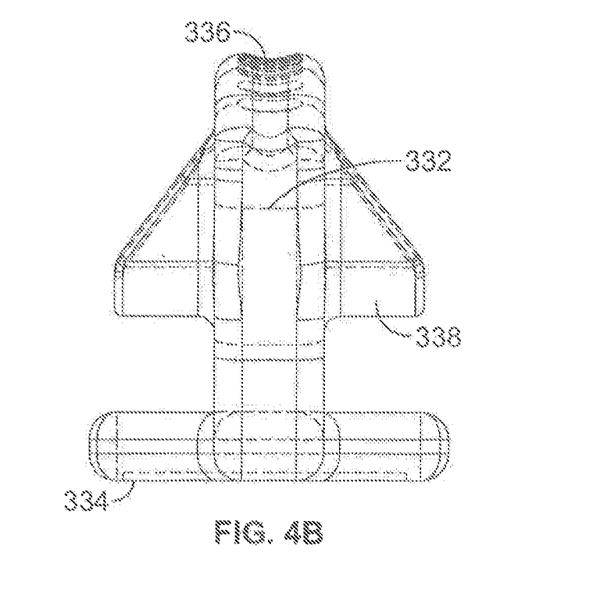
FIG. 4B is a top view of the clip of FIG. 4A.
Figure 4C:
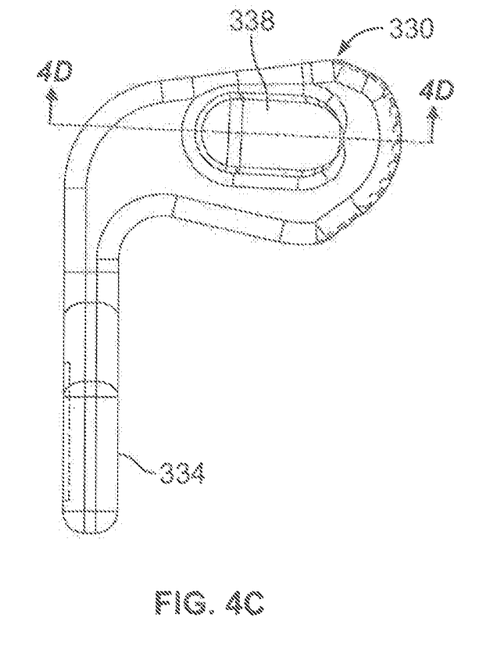
FIG. 4C is a side view of the clip of FIG. 4A.
Figure 4D:
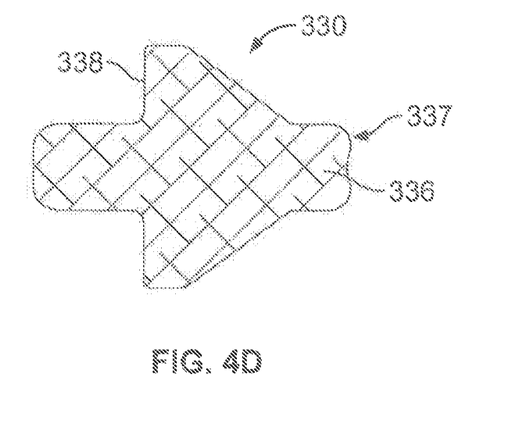
FIG. 4D is a cross-sectional view of the clip taken along line 4D-4D of FIG. 4C.
Figure 4E:
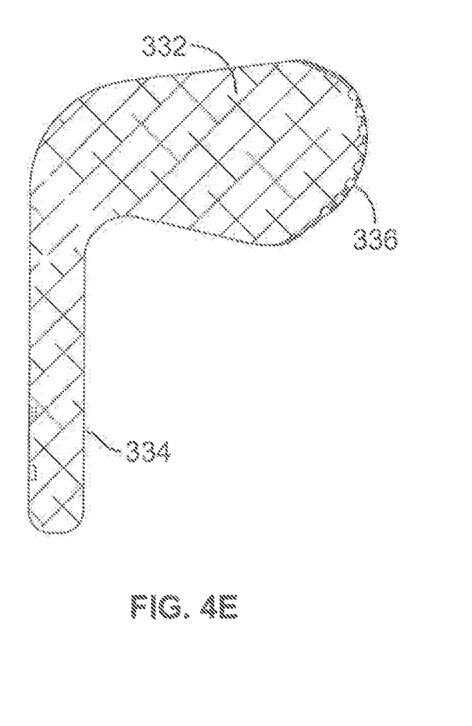
FIG. 4E is a side cross-sectional view of the clip of FIG. 4A taken along a center line of the clip.
Figure 4F:
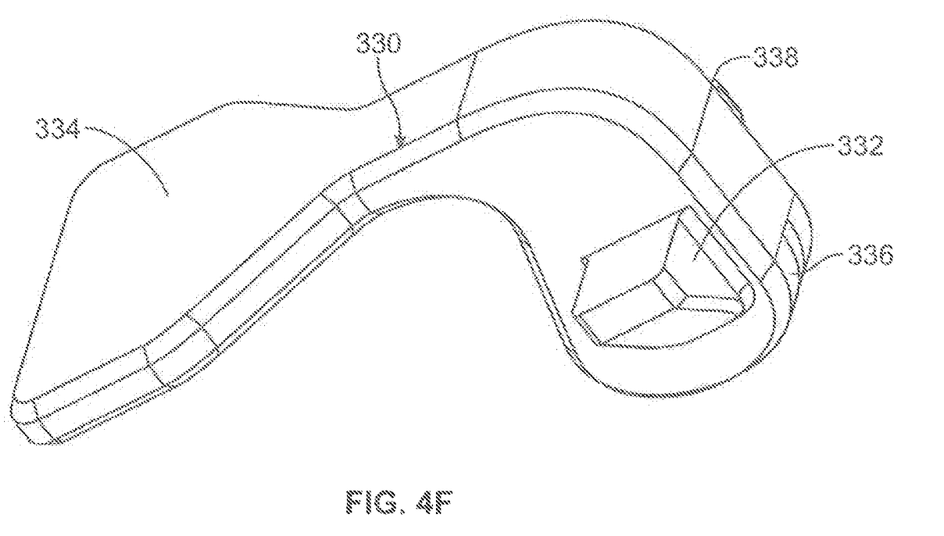
FIG. 4F is a first perspective view of the clip of FIGS. 4A-4E.
Figure 4G:
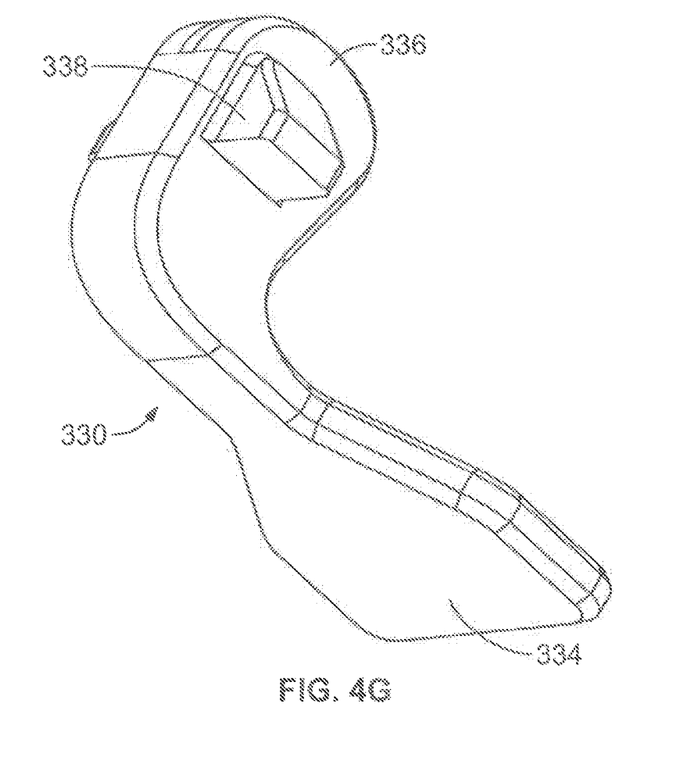
FIG. 4G is a second perspective view of the clip of FIGS. 4A-4E.

Referring now to FIGS. 3A and 3B, the hanger rod 10 and the channel-type strut 20 are shown relative to a different embodiment of a clip 230. It should be noted that structures and function of the clip 230 are similar to the general structures and functions of the clip 30 in FIGS. 1A and 1B (except for the differences noted below), and that 200-series reference numerals have been used in FIGS. 3A and 3B to delineate similar structures (e.g., the handle portion 234 in the clip 230 in FIGS. 3A-3B is similar to the handle portion 34 in the clip 30 in FIGS. 1A-1B, etc.). In this embodiment, the clip 230 includes a smaller rod-clamping portion 232 that has a curved shape when viewed from the side, as shown in FIG. 3B. However, the rod-clamping portion 232 is still generally transverse to the handle portion 234. The fulcrum portion is located on a pair of rounded protrusions 238 that extend outwardly from the rod-clamping portion 232. Another difference is that the groove 237 on the rod-clamping portion 232 defines a curved rod-engagement surface 236. The radius of curvature of at least a portion of the curved rod-engaging surface of the groove 237 is approximately the same as a radius of curvature of the hanger rod 10. Due to the combination of the curved shape of the rod-clamping portion 232 and the curved rod-engagement surface 236 within the groove 237, the rod-clamping portion 232 slides upwardly along the hanger rod 10 as the handle portion 234 is rotated downwardly to the closed or operational position, such that different portions of the rod-engagement surface 236 come into engagement with the hanger rod 10 before the clip 230 reaches its final closed position.

Referring now to FIGS. 4A-4G, a different embodiment of a clip 330 for stiffening a hanger rod 10 is shown. It should be noted that structures and function of the clip 330 are similar to the general structures and function of the clip 30 in FIGS. 1A and 1B (except for the differences noted below), and that 300-series reference numerals have been used in FIGS. 4A-4G to delineate similar structures (e.g., the handle portion 334 in the clip 330 in FIGS. 4A-4G is similar to the handle portion 34 in the clip 30 in FIGS. 1A-1B, etc.). The rod-clamping portion 332 includes a groove 337 with a slightly concave, rounded engagement surface 336 for engaging the hanger rod 10. The fulcrum is located on surfaces of a pair of wing-shaped projections 338 extending outwardly from the rod-clamping portion 332, as shown best in the cross-sectional view in FIG. 4D, which is taken along line 4D-4D in FIG. 4C. Like the clip 230 of FIGS. 3A-3B, the rod-clamping portion 332 of the clip 330 has a rounded profile, as shown in the cross-sectional view of FIG. 4E, which is taken along the centerline of the clip 330. The handle portion 334 becomes wider to provide a larger surface for receiving a manual force from the user to actuate the clip 330 and move the clip 330 into its operational or closed position whereby it clamps the hanger rod 10 against an inner surface of the second wall 24 of the strut 20. The clip 330 can be formed by various processes, such as casting.

Figure 5:
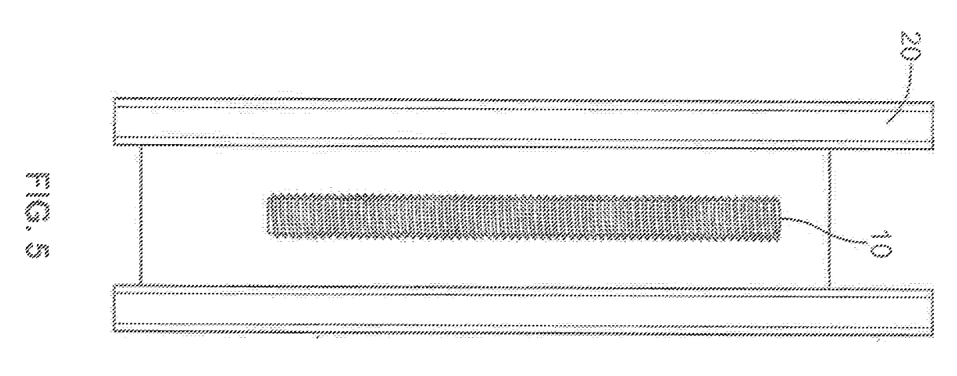
FIG. 5 illustrates a hanger rod within the strut.
Figure 6:
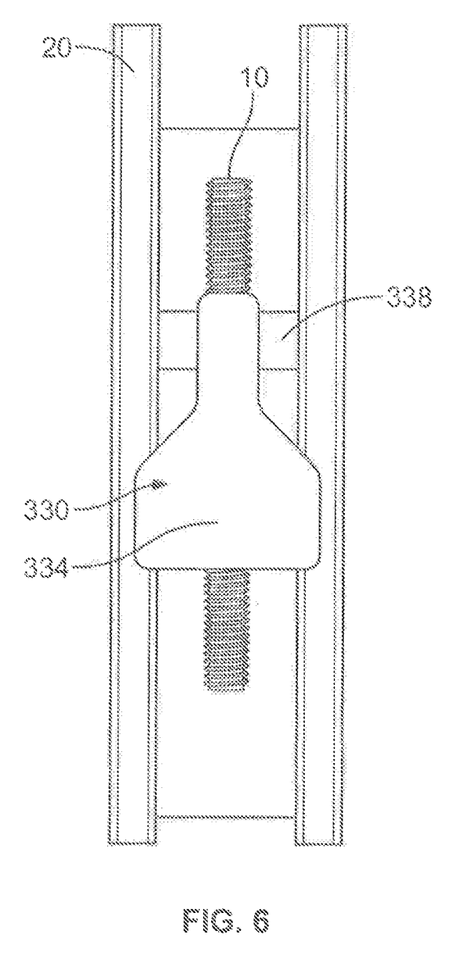
FIG. 6 illustrates the hanger rod of FIG. 5 being secured to strut by use of the clip of FIGS. 4A-4G.

FIGS. 5-6 illustrate the clip 330 of FIGS. 4A-4G in use on an exemplary hanger rod 10 located within an exemplary channel-type strut 20. FIG. 5 illustrates the hanger rod 10 positioned against a rear internal surface of the strut 20. FIG. 6 illustrates the clip 330 in its operational position after the handle 334 has been moved downwardly against the strut 20. When the rotational movement of the handle 334 toward the strut 20 occurs, the clip 330 pivots around the fulcrum on the projections 338 (which are engaging internal surfaces of the strut 10 adjacent to the elongated opening of the strut 20), causing the rounded rod-engagement surface 336 to be force the hanger rod 10 against the rear internal surface of the strut 20.

Figure 7A:
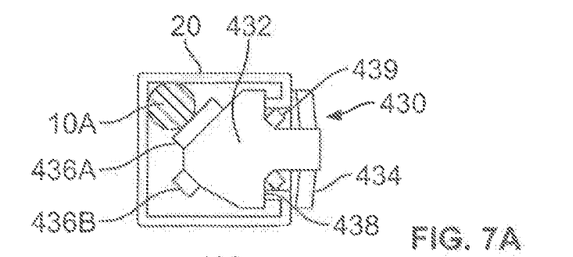
FIG. 7A is a top view of a clip and strut assembly for stiffening two sizes of hanger rods according to yet a further embodiment of the present invention.
Figures 7B, 7C, 8:
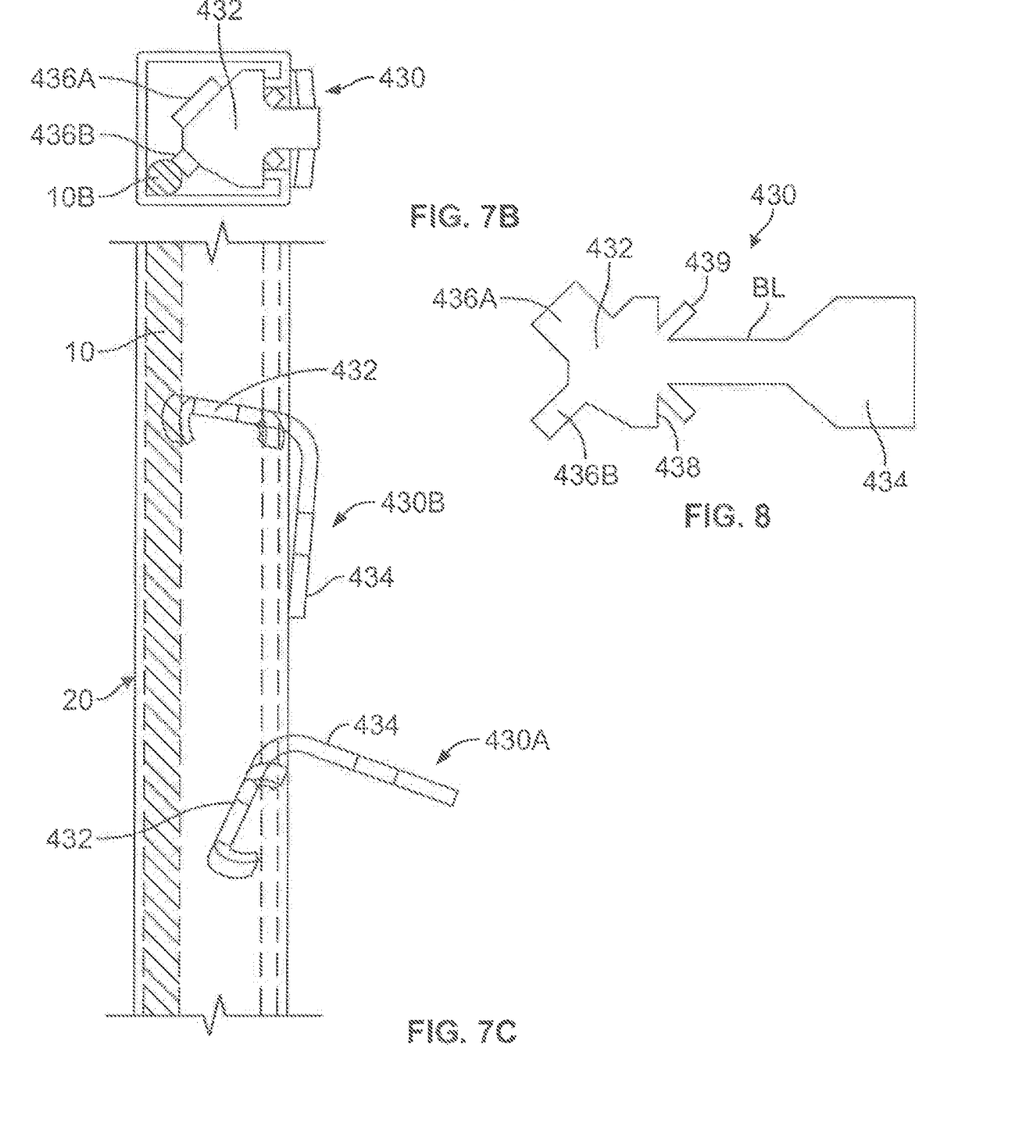
FIG. 7B is an alternative top view of the clip and strut assembly of FIG. 7A.
FIG. 7C is a side cross-sectional view of the clip and strut assembly of FIGS. 7A-7B.
FIG. 8 is a stamped piece of metal that can be formed into the clip illustrated in FIGS. 7A-7C.

Referring now to FIGS. 7A-7C, another embodiment of a clip 430 for stiffening a hanger rod 10 is shown. It should be noted that structures and function of the clip 430 are similar to the general structures and function of the clip 30 in FIGS. 1A and 1B (except for the differences noted below), and that 400-series reference numerals have been used in FIGS. 7A-7C to delineate similar structures (e.g., the handle portion 434 in clip 430 in FIGS. 7A-7C is similar to the handle portion 34 in the clip 30 in FIGS. 1A-1B, etc.). The clip 430 is somewhat asymmetric in that there are two different rod-engagement surfaces 436a and 436b having different sizes. The first rod-engagement surface 436a is configured to engage a first size of hanger rod 10a (FIG. 7A) such as a ½ inch diameter hanger rod, while the second rod-engagement surface 436*b* is configured to engage a second size of hanger rod 10*b* (FIG. 7B) such as ⅜ inch diameter hanger rod. As can be seen in FIGS. 7A and 7B, the first rod-engagement surface 436*a* clamps the hanger rod 10*a* in an upper corner defined by two internal surfaces of the strut 20, while the second rod-engagement surface 436*b* clamps the hanger rod 10*b* in a lower corner defined by two internal surfaces of the strut 20. Accordingly, the present invention also contemplates a single clip and strut assembly for independently stiffening multiple sizes of hanger rods by clamping those hanger rods at different locations within the strut 20. Thus, the clip 430 presents more of a modular design.

Additionally, the clip 430 includes a pair of registration tabs 439 near the pair of fulcrum portions 438. The pair of registration tabs 439 is for the purpose of maintaining the clip 430 in proper alignment and registration with the elongated opening of the strut 20. Each of the registration tabs 439 engages a corresponding surface that defines the opening of the strut 20 to help maintain the clip 430 in the proper horizontal orientation during insertion into the vertically oriented strut 20. The registration tabs 439 also maintain the proper orientation of the clip 430 during actuation of the handle 434 to transition the clip 430 into the closed position.

FIG. 8 illustrates one method that the clip 430 can be manufactured. Specifically, the clip 430 can be stamped from a piece of steel, and then bent into the final configuration that is shown in FIGS. 7A-7C. As one example, the clip 430 can be stamped from a flat piece of AISI 1008 or AISI 1010 zinc-plated steel having a thickness of between 0.15 and 0.25 inch. Each of the rod-engagement surfaces 436*a* and 436*b* can be formed by bending elongated tabs that extend outwardly from the main body of the rod-clamping portion 432. Similarly, the pair of registration tabs 439 can be bent from the clip 430 at regions that are adjacent to the rod-clamping portion 432. To create the transverse orientation between the handle 434 and the rod-clamping portion 432, the clip 430 can be bent around a primary bend line BL to an angle that is sufficient to allow the clip 430 to function in a manner that causes the hanger rod 10 to be forced into the corners of the strut 20, as shown in FIGS. 7A-7C.

Figure 9A:
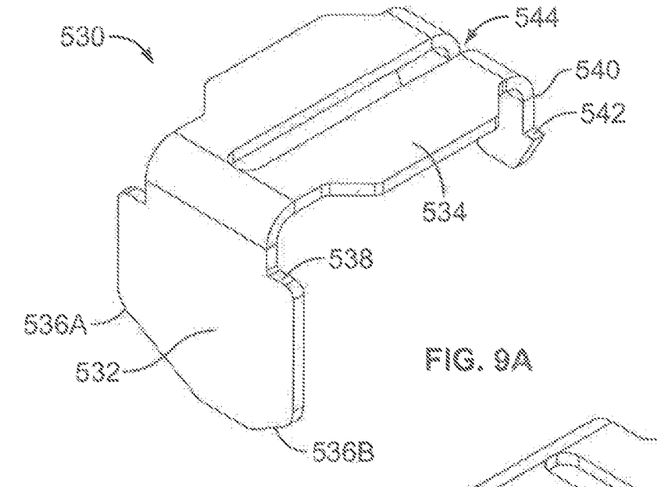
FIG. 9A is a perspective view of a clip for stiffening a hanger rod according to yet another embodiment of the present invention.
Figure 9B:
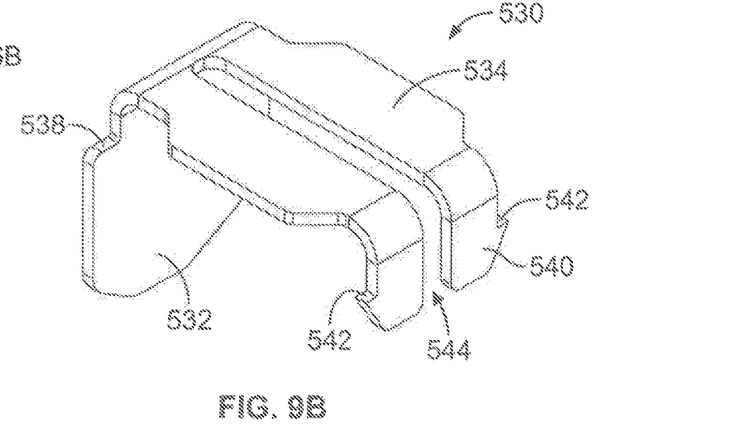
FIG. 9B is a second perspective view of the clip of FIG. 9A.
Figure 9C:
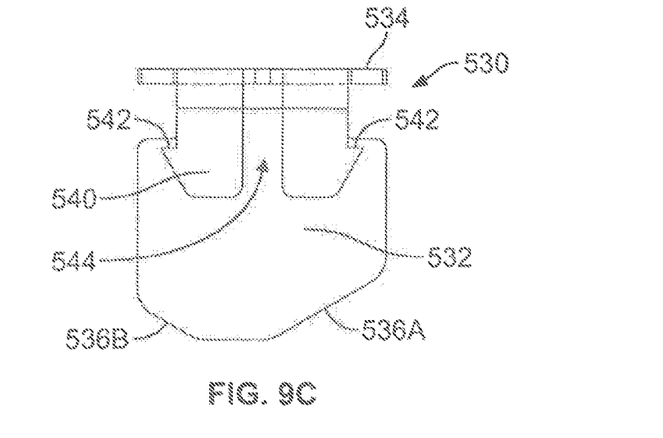
FIG. 9C is an end view of the clip of FIG. 9A.

FIGS. 9A-9C illustrate a clip 530 according to an embodiment of the present invention that is used for stiffening multiple sizes of hanger rods 10. It should be noted that structures and function of the clip 530 are similar to the general structures and function of the clip 30 in FIGS. 1A and 1B (except for the differences noted below), and that 500-series reference numerals have been used in FIGS. 9A-9C to delineate similar structures (e.g., the handle portion 534 in clip 530 in FIGS. 9A-9C is similar to the handle portion 34 in the clip 30 in FIGS. 1A-1B, the fulcrum portion 538 in clip 530 in FIGS. 9A-9C is similar to the fulcrum portion 38 in the clip 30 in FIGS. 1A-1B, etc.). The clip 530 is asymmetric in that there are two different rod-engagement surfaces 536*a* and 536*b* for engaging rods of different sizes, as will described below relative to FIGS. 10A-10D.

Additionally, the handle portion 534 of the clip 530 includes a locking portion 540 with a pair of latching fingers 542. The handle portion 534 is split into two sections via an elongated notch 544 that separates the pair of latching fingers 540. The elongated notch 544 is positioned along the central axis of the handle portion 534 so as to allow the latching fingers 540 to spring inwardly during insertion into the strut, which is shown in FIG. 10 below. The latching fingers 540 engage an inner surface of the strut 20 to help retain the clip 530 within the strut 20 as the clip 530 holds the hanger rod. Although not shown, the locking portion 540 may further include one or more holes that permit insertion of a tool (e.g., a screwdriver) that can twist the latching fingers 542 inwardly and overcome the spring force of the two sections of the handle portion 540 during removal of the clip 530 from the strut 20. The dimensions (width and length) of the elongated notch 544 are chosen to optimize the spring force associated with the handle portion 540.

Figure 10A:
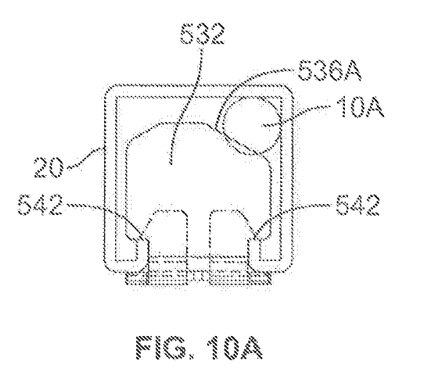
FIG. 10A is a top view of the clip of FIG. 9 that is assembled in the strut, and used with a first hanger rod size.
Figure 10B:
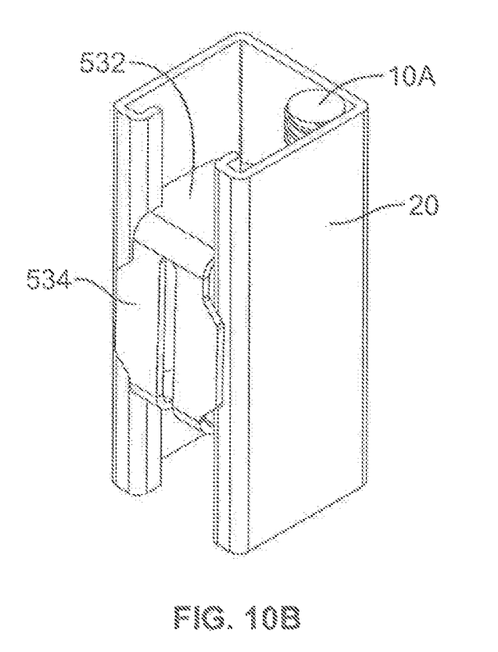
FIG. 10B is a perspective view of the clip and strut assembly of FIG. 10A.
Figure 10C:
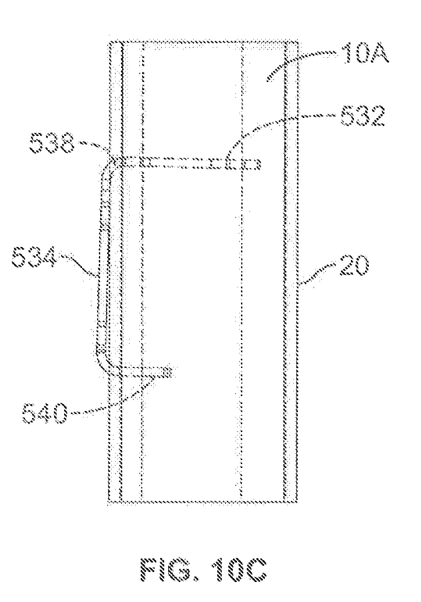
FIG. 10C is a side cross-sectional view of the clip and strut assembly of FIG. 10A.
Figure 10D:
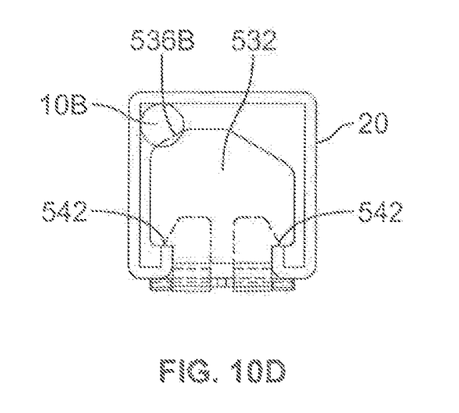
FIG. 10D is another top view of the clip of FIG. 9 that is assembled in the strut, and used with a second hanger rod size relative to the hanger rod size in FIGS. 10A-10C.

As shown in FIGS. 10A-10C, the first rod-engagement surface 536*a* is configured to engage a first size of hanger rod 10*a*, such as a ½ inch diameter hanger rod. As can be seen best in FIG. 10A, the first rod-engagement surface 536*a* clamps the hanger rod 10*a* in a first corner defined by two internal surfaces of the strut 20. On the other hand, as show in FIG. 10D, in an alternative use, the second rod-engagement surface 536*b* clamps the smaller hanger rod 10*b* (e.g. ¼ inch diameter hanger rod) in a second corner defined by two internal surfaces of the strut 20. Like the clip 430 of FIG. 7, the clip 530 presents more of a modular design, allowing for a single clip and strut assembly to independently stiffen multiple sizes of hanger rods by clamping those hanger rods at different locations within the strut 20.

FIGS. 10A-10D also illustrate the locking portion 540 of the clip 530 in use. During assembly, the pair of latching fingers 542 engage the inner walls of the strut 20 and are forced toward each other as the handle portion 534 is moved downwardly into the operational position. The dimensions of the clip 530 are chosen such that the handle portion 432 is substantially parallel to the longitudinal axis of the strut 20 as the latching fingers 542 clear the space of the inner walls of the strut 20 and resiliently snap outwardly to help lock the clip 530 in place along the strut 20. At this point, one of the engaging surfaces 536*a* or 536*b* is forcing the hanger rod 10A or 10B into tight engagement with the corners of the strut 20 and the final assembly process is complete. The locking portion 540 can also be applied to any of the designs of the previous clips described relative to FIGS. 1-8.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of providing stiffness to a hanger rod that is received by a strut, the method comprising:
   aligning the hanger rod within a channel of the strut, with the hanger rod extending along an elongate direction of the channel;
   inserting a hanger-rod clip into the channel in an insertion direction that is transverse to the elongate direction, so that a rod-engaging wall of the hanger-rod clip engages the hanger rod within the channel; and
   moving a handle of the hanger-rod clip to place the hanger-rod clip in a secured configuration with wings of the hanger-rod clip engaging inner surfaces of the strut on opposing sides of the channel to resiliently urge the hanger rod, via the rod-engaging wall, into an internal wall of the channel.

2. The method of claim 1, wherein the inner surfaces of the strut face toward the internal wall of the channel.

3. The method of claim 1, wherein, with the hanger-rod clip in the secured configuration, the rod-engaging wall extends transverse to the elongate direction and is obliquely angled relative to the insertion direction.

4. The method of claim 1, wherein, with the hanger-rod clip in the secured configuration, the handle extends to the exterior of the channel.

5. The method of claim 4, wherein, with the hanger-rod clip in the secured configuration, the handle extends along the elongate direction exterior to the channel.

6. The method of claim 5, wherein the hanger-rod clip is a unitary clip body that includes the handle, the rod-engaging wall, and the wings.

7. The method of claim 1, wherein moving the handle includes manually pivoting the handle relative to the strut.

8. The method of claim 1, wherein the rod-engaging wall is a first rod-engaging wall, and the hanger-rod clip includes a second rod-engaging wall also configured to engage the hanger rod within the channel to resiliently urge the hanger rod into the internal wall of the channel.

9. The method of claim 8, wherein the first rod-engaging wall and the second rod-engaging wall are angled obliquely relative to the insertion direction, so that the first rod-engaging wall is configured to urge the hanger rod in a first direction against the internal wall of the channel and the second rod-engaging wall is configured to urge the hanger rod in a second direction against the internal wall of the channel, the second direction being different from the first direction.

10. The method of claim 1, wherein an angled wall extending from the handle resiliently engages at least one of the inner surfaces of the strut to secure the hanger-rod clip in the secured configuration.

11. A method of providing stiffness to a hanger rod that is received by a strut, the method comprising:
   inserting the hanger rod within a channel of the strut, with the hanger rod extending along an elongate direction of the channel;
   inserting a hanger-rod clip into the channel in an insertion direction that is transverse to the elongate direction, so that a rod-engaging wall of the hanger-rod clip engages the hanger rod within the channel; and
   actuating the hanger-rod clip so that the hanger-rod clip bears against inner surfaces of the strut to sandwich the hanger rod between the rod-engaging wall of the hanger-rod clip and an internal wall of the channel.

* * * * *

UNITED STATES PATENT AND TRADEMARK OFFICE
CERTIFICATE OF CORRECTION

PATENT NO. : 12,215,734 B2
APPLICATION NO. : 18/310499
DATED : February 4, 2025
INVENTOR(S) : Daniel C. Duggan Page 1 of 1

It is certified that error appears in the above-identified patent and that said Letters Patent is hereby corrected as shown below:

In the Specification

Column 7, Line 21, "of 1%" should be --of 1⅝--.

Signed and Sealed this
Twenty-fifth Day of March, 2025

Coke Morgan Stewart
*Acting Director of the United States Patent and Trademark Office*